(12) United States Patent
Ward

(10) Patent No.: US 11,573,941 B2
(45) Date of Patent: *Feb. 7, 2023

(54) SYSTEMS, METHODS, AND DATA STRUCTURES FOR HIGH-SPEED SEARCHING OR FILTERING OF LARGE DATASETS

(71) Applicant: Moonshadow Mobile, Inc., Eugene, OR (US)

(72) Inventor: Roy W. Ward, Eugene, OR (US)

(73) Assignee: MOONSHADOW MOBILE, INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,326

(22) Filed: Aug. 30, 2021

(65) Prior Publication Data

US 2022/0058168 A1    Feb. 24, 2022

Related U.S. Application Data

(63) Continuation of application No. 16/719,853, filed on Dec. 18, 2019, now Pat. No. 11,106,646, which is a continuation of application No. 15/233,047, filed on Aug. 10, 2016, now Pat. No. 10,521,411.

(51) Int. Cl.
*G06F 16/22* (2019.01)
*G06F 16/2455* (2019.01)

(52) U.S. Cl.
CPC ...... *G06F 16/2246* (2019.01); *G06F 16/2455* (2019.01)

(58) Field of Classification Search
CPC .................. G06F 16/2246; G06F 16/2455
See application file for complete search history.

(56) References Cited

U.S. PATENT DOCUMENTS

| | | |
|---|---|---|
| 5,276,868 A | 1/1994 | Poole |
| 5,557,786 A | 9/1996 | Johnson |
| 5,655,129 A | 8/1997 | Ito |
| 5,710,915 A | 1/1998 | McElhiney |
| 5,721,899 A | 2/1998 | Namba |
| 5,737,732 A | 4/1998 | Gibson et al. |
| 5,829,004 A | 10/1998 | Au |

(Continued)

OTHER PUBLICATIONS

International Search Report dated Aug. 27, 2012 in co-owned App No. PCT/US2012/020841; cited in parent.

(Continued)

*Primary Examiner* — Apu M Mofiz
*Assistant Examiner* — Farhad Agharahimi
(74) *Attorney, Agent, or Firm* — David S. Alavi

(57) ABSTRACT

An inline tree data structure and one or more auxiliary data structure encode a multitude of data records of a dataset; data fields of the dataset define a tree hierarchy. The inline tree comprises one binary string for each data record that are all the same length, are arranged in an ordered sequence that corresponds to the tree hierarchy, and include an indicator string indicating position in the tree hierarchy of each data record relative to an immediately adjacent data record. A search program is guided through the dataset by interrogating each indicator string in the inline tree data structure so as to reduce unnecessary interrogation of data field values.

20 Claims, 9 Drawing Sheets

(56) References Cited

U.S. PATENT DOCUMENTS

| | | | |
|---|---|---|---|
| 5,978,797 A | 11/1999 | Yianilos | |
| 6,012,057 A | 1/2000 | Mayer et al. | |
| 6,175,835 B1 | 1/2001 | Shadmon | |
| 6,341,280 B1 | 1/2002 | Glass et al. | |
| 6,374,251 B1 | 4/2002 | Fayyad et al. | |
| 6,499,033 B1 | 12/2002 | Vagnozzi | |
| 6,560,610 B1 | 5/2003 | Eatherton et al. | |
| 6,581,058 B1 | 6/2003 | Fayyad et al. | |
| 6,654,760 B2 | 11/2003 | Baskins et al. | |
| 6,675,171 B2 * | 1/2004 | Tikkanen | G06F 16/9027 |
| 6,721,723 B1 | 4/2004 | Gibson et al. | |
| 6,728,732 B1 | 4/2004 | Eatherton et al. | |
| 7,827,218 B1 | 11/2010 | Mittal | |
| 8,055,645 B1 * | 11/2011 | Sinha | G06F 16/13 707/711 |
| 8,892,818 B1 | 11/2014 | Zheng et al. | |
| 8,977,656 B2 | 3/2015 | Ward et al. | |
| 8,990,204 B1 | 3/2015 | Ward | |
| 9,002,859 B1 | 4/2015 | Ward | |
| 9,171,054 B1 | 10/2015 | Ward | |
| 9,411,898 B1 | 8/2016 | Ward | |
| 9,626,401 B1 | 4/2017 | Ward | |
| 9,652,467 B2 | 5/2017 | Ward et al. | |
| 9,697,250 B1 | 7/2017 | Ward | |
| 10,248,621 B2 | 4/2019 | Ward et al. | |
| 10,521,411 B2 | 12/2019 | Ward | |
| 11,100,068 B2 | 8/2021 | Ward | |
| 11,106,646 B2 | 8/2021 | Ward | |
| 2001/0042186 A1 | 11/2001 | Iivonen et al. | |
| 2002/0035660 A1 | 3/2002 | Tikkanen et al. | |
| 2002/0087510 A1 | 7/2002 | Weinberg et al. | |
| 2003/0018626 A1 | 1/2003 | Vishnubhotla | |
| 2003/0061189 A1 | 3/2003 | Baskins et al. | |
| 2003/0061227 A1 | 3/2003 | Baskins et al. | |
| 2003/0105745 A1 | 6/2003 | Davidson et al. | |
| 2004/0059725 A1 | 3/2004 | Sharangpani et al. | |
| 2004/0107184 A1 | 6/2004 | Longshaw | |
| 2004/0111439 A1 | 6/2004 | Richardson et al. | |
| 2004/0117396 A1 | 6/2004 | Avadhanam et al. | |
| 2004/0133590 A1 | 7/2004 | Henderson et al. | |
| 2004/0193619 A1 | 9/2004 | Venkatachary et al. | |
| 2004/0205517 A1 | 10/2004 | Lampert et al. | |
| 2004/0243576 A1 | 12/2004 | Shrivastava et al. | |
| 2004/0267710 A1 | 12/2004 | Cotarmanac'h et al. | |
| 2005/0027744 A1 | 2/2005 | Avadhanam et al. | |
| 2005/0055351 A1 | 3/2005 | Barton et al. | |
| 2005/0091223 A1 | 4/2005 | Shaw et al. | |
| 2005/0171959 A1 | 8/2005 | Deforche et al. | |
| 2005/0240604 A1 | 10/2005 | Corl et al. | |
| 2005/0251331 A1 | 11/2005 | Kreft | |
| 2006/0271540 A1 | 11/2006 | Williams | |
| 2006/0282457 A1 | 12/2006 | Williams | |
| 2006/0288024 A1 | 12/2006 | Braica | |
| 2007/0192548 A1 | 8/2007 | Williams | |
| 2007/0255748 A1 | 11/2007 | Ferragina et al. | |
| 2008/0019317 A1 | 1/2008 | Vellanki et al. | |
| 2008/0086464 A1 | 4/2008 | Enga | |
| 2009/0077113 A1 | 3/2009 | Fidaali et al. | |
| 2009/0138790 A1 | 5/2009 | Larcheveque et al. | |
| 2009/0187545 A1 | 7/2009 | Kaku et al. | |
| 2010/0011125 A1 | 1/2010 | Yang et al. | |
| 2010/0023515 A1 | 1/2010 | Marx | |
| 2010/0057792 A1 | 3/2010 | Ylonen | |
| 2010/0085223 A1 | 4/2010 | Hendrickson | |
| 2010/0127902 A1 | 5/2010 | Schneider | |
| 2010/0146004 A1 | 6/2010 | Sim-Tang | |
| 2010/0185609 A1 | 7/2010 | Wright et al. | |
| 2010/0281082 A1 | 11/2010 | Ylonen | |
| 2010/0332561 A1 | 12/2010 | Prahlad et al. | |
| 2011/0016153 A1 | 1/2011 | Atta et al. | |
| 2012/0005239 A1 | 1/2012 | Nevin et al. | |
| 2012/0016908 A1 | 1/2012 | Leung et al. | |
| 2015/0324398 A1 | 11/2015 | Xiao et al. | |
| 2015/0356128 A1 | 12/2015 | Nishimura | |
| 2017/0316041 A1 * | 11/2017 | Delaney | G06F 16/2237 |

OTHER PUBLICATIONS

International Search Report dated Oct. 26, 2017 in co-owned counterpart App No. PCT/US2017/042471; cited in parent.

Gabow: Data structures for weighted matching and nearest common ancestors with linking; U Colorado, Boulder, Comp Sci Dept; 1990; cited in parent.

Acharya et al; Adaptive Algorithms for Cache-efficient Trie Search; ALENEX'99, LNCS 1619, pp. 296-311, Goodrich & McGeoch (Eds); Springer-Verlag (1999); cited in parent.

Bagwell; Fast and Space Efficient Trie Searches; 2000; cited in parent.

Co-owned U.S. Appl. No. 17/408,493, filed Aug. 23, 2021 in the names of Ward et al.

* cited by examiner

FIG. 4
(prior art)

| FA1 | FAn | FAp; FAq |
|---|---|---|
| FA1(1) | FAn(1) | FAp(1); FAq(1) |
| FA1(2) | FAn(2) | FAp(2); FAq(2) |
| FA1(3) | FAn(3) | FAp(3); FAq(3) |
| ... | ... | ... ... |
| FA1(x) | FAn(x) | FAp(x); FAq(x) |
| ... | ... | ... |

| FB1 | FBm | FBr; FBs |
|---|---|---|
| FB1(1,1) | FBm(1,1) | FBr(1,1); FBs(1,1) |
| FB1(1,2) | FBm(1,2) | FBr(1,2); FBs(1,2) |
| FB1(1,3) | FBm(1,3) | FBr(1,3); FBs(1,3) |
| ... | ... | ... ... |
| FB1(2,1) | FBm(2,1) | FBr(2,1); FBs(2,1) |
| FB1(2,2) | FBm(2,2) | FBr(2,2); FBs(2,2) |
| FB1(2,3) | FBm(2,3) | FBr(2,3); FBs(2,3) |
| ... | ... | ... ... |
| FB1(3,1) | FBm(3,1) | FBr(3,1); FBs(3,1) |
| FB1(3,2) | FBm(3,2) | FBr(3,2); FBs(3,2) |
| FB1(3,3) | FBm(3,3) | FBr(3,3); FBs(3,3) |
| ... | ... | ... ... |
| FB1(x,y) | FBm(x,y) | FBr(x,y); FBs(x,y) |
| ... | ... | ... |

| FC1 | FCp | FCq; FCr |
|---|---|---|
| FC1(1,1,1) | FCp(1,1,1) | FCq(1,1,1); FCr(1,1,1) |
| FC1(1,1,2) | FCp(1,1,2) | FCq(1,1,2); FCr(1,1,2) |
| FC1(1,1,3) | FCp(1,1,3) | FCq(1,1,3); FCr(1,1,3) |
| ... | ... | ... |
| FC1(1,2,1) | FCp(1,2,1) | FCq(1,2,1); FCr(1,2,1) |
| FC1(1,2,2) | FCp(1,2,2) | FCq(1,2,2); FCr(1,2,2) |
| FC1(1,2,3) | FCp(1,2,3) | FCq(1,2,3); FCr(1,2,3) |
| ... | ... | ... |
| FC1(1,3,1) | FCp(1,3,1) | FCq(1,3,1); FCr(1,3,1) |
| FC1(1,3,2) | FCp(1,3,2) | FCq(1,3,2); FCr(1,3,2) |
| FC1(1,3,3) | FCp(1,3,3) | FCq(1,3,3); FCr(1,3,3) |
| ... | ... | ... |
| FC1(2,1,1) | FCp(2,1,1) | FCq(2,1,1); FCr(2,1,1) |
| FC1(2,1,2) | FCp(2,1,2) | FCq(2,1,2); FCr(2,1,2) |
| FC1(2,1,3) | FCp(2,1,3) | FCq(2,1,3); FCr(2,1,3) |
| ... | ... | ... |
| FC1(2,2,1) | FCp(2,2,1) | FCq(2,2,1); FCr(2,2,1) |
| FC1(2,2,2) | FCp(2,2,2) | FCq(2,2,2); FCr(2,2,2) |
| FC1(2,2,3) | FCp(2,2,3) | FCq(2,2,3); FCr(2,2,3) |
| ... | ... | ... |
| FC1(2,3,1) | FCp(2,3,1) | FCq(2,3,1); FCr(2,3,1) |
| FC1(2,3,2) | FCp(2,3,2) | FCq(2,3,2); FCr(2,3,2) |
| FC1(2,3,3) | FCp(2,3,3) | FCq(2,3,3); FCr(2,3,3) |
| ... | ... | ... |
| FC1(3,1,1) | FCp(3,1,1) | FCq(3,1,1); FCr(3,1,1) |
| FC1(3,1,2) | FCp(3,1,2) | FCq(3,1,2); FCr(3,1,2) |
| FC1(3,1,3) | FCp(3,1,3) | FCq(3,1,3); FCr(3,1,3) |
| ... | ... | ... |
| FC1(3,2,1) | FCp(3,2,1) | FCq(3,2,1); FCr(3,2,1) |
| FC1(3,2,2) | FCp(3,2,2) | FCq(3,2,2); FCr(3,2,2) |
| FC1(3,2,3) | FCp(3,2,3) | FCq(3,2,3); FCr(3,2,3) |
| ... | ... | ... |
| FC1(3,3,1) | FCp(3,3,1) | FCq(3,3,1); FCr(3,3,1) |
| FC1(3,3,2) | FCp(3,3,2) | FCq(3,3,2); FCr(3,3,2) |
| FC1(3,3,3) | FCp(3,3,3) | FCq(3,3,3); FCr(3,3,3) |
| ... | ... | ... |
| FC1(x,y,z) | FCp(x,y,z) | FCq(x,y,z); FCr(x,y,z) |
| ... | ... | ... |

FIG. 6C

SYSTEMS, METHODS, AND DATA STRUCTURES FOR HIGH-SPEED SEARCHING OR FILTERING OF LARGE DATASETS

BENEFIT CLAIMS TO RELATED APPLICATIONS

This application is a continuation of U.S. non-provisional application Ser. No. 16/719,853 entitled "Systems, methods, and data structures for high-speed searching or filtering of large datasets" filed Dec. 18, 2019 in the name of Roy W. Ward (now U.S. Pat. No. 11,106,646), which is a continuation of U.S. non-provisional application Ser. No. 15/233,047 entitled "Systems, methods, and data structures for high-speed searching or filtering of large datasets" filed Aug. 10, 2016 in the name of Roy W. Ward (now U.S. Pat. No. 10,521,411), both of said applications being incorporated by reference as if set forth herein in their entireties.

FIELD OF THE INVENTION

The field of the present invention relates to electronic data storage, searching, filtering, listing, enumeration, or retrieval. In particular, systems, methods, and data structures are disclosed herein for high-speed searching or filtering of large datasets.

BACKGROUND

This application related to subject matter disclosed in (i) U.S. non-provisional application Ser. No. 13/326,326 filed Dec. 15, 2011 in the name of Roy W. Ward (now U.S. Pat. No. 9,002,859), (ii) U.S. non-provisional application Ser. No. 13/347,646 filed Jan. 10, 2012 in the names of Roy W. Ward and David S. Alavi (now U.S. Pat. No. 8,977,656 issued to Ward), and (iii) U.S. non-provisional application Ser. No. 13/733,890 filed Jan. 4, 2013 in the name of Roy W. Ward (now U.S. Pat. No. 9,171,054). Each of said applications and patents is hereby incorporated by reference as if fully set forth herein, and said applications and patents are hereinafter referred to collectively as the "inline tree patents."

Many situations exist in which very large amounts of data are generated or collected (e.g., $10^4$, $10^6$, $10^8$, or more data records, each comprising a handful, dozens, or a hundred or more data fields). For data in a dataset to be of any practical use, indicia representing the dataset are stored according to a data structure arranged so that information in the dataset can be searched, filtered, listed, enumerated, located, or retrieved. In the pre-digital past, such data structures often comprised printed alphanumeric indicia on suitable media (often including an accompanying printed index), and data search and retrieval were manual functions performed by humans. The introduction of electronic data storage and search capabilities around the middle of the last century revolutionized the ability to store large datasets, and to search, filter, list, enumerate, locate, or retrieve information in the stored dataset.

Today, alphanumeric indicia representative of a dataset are typically stored according to digital, electronic data structures such as an electronic spreadsheet or an electronic relational database. A spreadsheet (also referred to as a flat file database) can be thought of as a single table with rows and columns, with each row corresponding to a specific data record, and with each column corresponding to a specific data field of that data record. In a simple example (one that will be used repeatedly within the instant specification), each data record can correspond to a registered voter in a dataset of all registered voters in a particular state, e.g., Oregon. The data fields in each data record can include, e.g., last name, first name, middle name or initial, age, gender, marital status, race, ethnicity, religion, other demographic information, street address (likely divided into multiple data fields for street number, street name, and so on), city, state, zip code, party affiliation, voting history, county, U.S. house district, state senate or house district, school district, other administrative districts, and so on.

A relational database typically comprises multiple tables, each comprising multiple records with multiple fields, and relations defined among various fields in different tables. In the registered voter example given above, a "voter" table might include voter records with name and demographic information in corresponding fields, and an "address" table might include address records that includes street address and district information in corresponding fields. A field in the voter table can include a pointer to the corresponding address in the address table, defining a one-to-many relationship between each address and one or more corresponding voters. Other tables and relationships can be defined (including many-to-many relationships and so called pivot tables to define them).

Electronic spreadsheets and electronic relational databases have become standard methods for storing digital datasets. They offer nearly unlimited flexibility in arranging the data, for updating the data, for adding new data, and for sorting, searching, filtering, or retrieving data. However, it has been observed that for a very large dataset (e.g., >$10^6$ or more records, or even as few as >$10^4$ or >$10^6$ records), spreadsheets and databases tend to become unwieldy to store, access, and search. In particular, search and retrieval of information from such a large electronic dataset can become so slow as to render it essentially useless for certain data retrieval applications.

The inline tree patents cited above disclose alternative systems and methods for high-speed searching and filtering of large datasets. As disclosed in those patents, and in contrast to conventional spreadsheets and relational databases, the dataset is stored as a specialized, highly compressed binary data structure that is generated from a more conventional data structure using a dedicated, specifically adapted conversion program; that binary data structure is searched and filtered using a dedicated, specifically adapted search and filter program. The inline tree data structure typically can be stored in a binary file that occupies less than about 1 to 2 bytes per field per record on a digital storage medium (e.g., a dataset of one million records having 100 fields each can be stored in less than about 100 to 200 MB). The significant size reduction relative to a spreadsheet or a relational database (often greater than 10× reduction) can often enable the entire dataset to be loaded into random access memory for searching and filtering, significantly increasing the speed of those operations. The small size and contiguous arrangement of the inline tree data structure also speeds search and filter processes, so that a large dataset (e.g., $10^6$, $10^8$, or more data records each including over 100 data fields) can be searched and filtered in less than about 150 to 500 nanoseconds per record per processor core.

In an additional modification (disclosed in the second and third inline tree applications), a so-called clump header table can be employed to indicate groups of data records that share a large number of data field values (e.g., geographically constrained field values such as country, city, congressional district, school district, and so on, that cannot appear in arbitrary combinations) and to direct the search and filter program to only those portions of the inline tree data structure for which the clumped data field values match the search or filter criteria. In a further modification (disclosed in the third of the inline tree applications), an auxiliary, parallel data structure of can be employed along with the inline tree data structure to store additional or replacement data field values. The search and filter program can be adapted to interrogate the inline tree data structure and the auxiliary data structure in parallel. The auxiliary data structure can be employed for enabling modifications to certain data field values without regenerating the entire inline tree data structure, to enable different users of the inline tree data structure to append their own additional data fields, to facilitate aggregation of certain data records for licensing or purchase, or for other purposes.

As noted above, inline tree data structures of the inline tree patents have a highly specialized structure that must be generated by a dedicated, specially adapted conversion program, and must be search and filtered by a dedicated, specially adapted search and filter program. Unlike a spreadsheet or a relational database, an inline tree data structure is unwieldy to modify to include new or updated data. For new or replacement data to be inserted into existing data fields, or to add entire new records to the dataset, often the conversion program is executed to generate an entirely new inline tree structure. For new data fields to be added to the dataset, the conversion program must be adapted to accommodate those new fields before generating a new inline tree structure, and the search and filter program must be adapted to accommodate the new inline tree data structure. As noted in the inline tree patents, this loss of flexibility and updateability is the price paid to obtain the small size and speedy searching of the inline tree data structure.

SUMMARY

Electronic indicia of a dataset comprises an inline tree data structure and one or more auxiliary data structures. The dataset comprises a multitude of data records, and each data record includes field value strings for multiple corresponding defined data fields. The defined data fields include terminal-node data fields and first-level branch node data fields, and can further include one or more levels of higher-level branch-node data fields; the branch-node data fields define a hierarchical tree relationship among subranges of field value strings of the branch-node data fields, which subranges correspond to one or more levels of multiple branch-node subsets of the data records of the dataset.

The inline tree data structure comprises an ordered sequence of only terminal-node binary strings. There is a one-to-one correspondence between the terminal-node binary strings and the data records of the dataset, and the terminal-node binary strings have the same length as one another. Each terminal-node binary string includes an indicator string, and for each terminal-node binary string the indicator string indicates (i) the terminal-node binary string and an immediately adjacent terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure. In some examples, for all of the terminal-node binary strings except the first, the adjacent terminal-node binary string is the immediately preceding terminal-node binary string. In some other examples, for all of the terminal-node binary strings except the last, the adjacent terminal-node binary string is the immediately succeeding terminal-node binary string.

For each first-level branch-node subset, the corresponding terminal-node binary strings form a single contiguous string sequence within the inline tree data structure. For each higher-level branch-node subset (if present), the corresponding terminal-node binary strings form a single contiguous string sequence within the inline tree data structure. The one or more auxiliary data structures include electronic indicia of field value strings of the data records of the dataset arranged, indexed, or otherwise accessible in the same order as the ordered sequence of terminal-node binary strings in the inline tree data structure.

A computer-implemented method comprises: (A) receiving at a computer system or reading from one or more computer-readable storage media first electronic indicia of the dataset; (B) using one or more electronic processors of the computer system that are programmed therefor and operatively coupled to the one or more storage media, generating second electronic indicia of the dataset, the second electronic indicia comprising the inline tree data structure and the one or more auxiliary data structures; and (C) storing the inline tree data structure and the one or more auxiliary data structures on one or more computer-readable storage media operatively coupled to the one or more electronic processors of the computer system.

A computer-implemented method comprises: (A) receiving at a computer system a search query for data records of the dataset that include, for each one of one or more selected queried data fields among the defined data fields of the dataset, a corresponding field value that falls within a corresponding queried field value subrange; (B) automatically, with a computer processor programmed therefor, interrogating, in order, the ordered sequence of the terminal-node binary strings of the inline tree data structure to identify the corresponding indicator string; (C) as each terminal node binary string interrogated in part (B), automatically interrogating, in the one or more auxiliary data structures with a computer processor programmed therefor, field value strings only among the selected queried data fields of the corresponding data record, to identify data records that satisfy the search query of part (A), wherein the field value strings interrogated in part (C) for each data record are determined in part by the corresponding indicator string identified in part (B); (D) for each first-level branch-node field value that does not satisfy the search query of part (A), omitting from the interrogation of part (C) terminal-node data fields of the corresponding first-level branch-node subset of the data records; (E) for each higher-level branch-node field value (if present) that does not satisfy the search query of part (A), omitting from the interrogation of part (C) first-level and terminal-node data fields of the corresponding higher-level branch-node subset of the data records; and (F) automatically generating, with a computer processor programmed therefor, a list or an enumeration of data records that are identified in part (C) as satisfying the search query received in part (A).

Objects and advantages pertaining to electronic data search or filtering or retrieval may become apparent upon referring to the exemplary embodiments illustrated in the drawings and disclosed in the following written description or appended claims. This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates schematically an example of indicia corresponding to the example dataset of FIG. 1 arranged in an example of an inline tree data structure of the inline tree patents.

FIGS. 6A through 6C illustrate schematically examples of auxiliary data structures of the inventive storage arrangement for the example dataset of FIG. 1.

Figure 1:
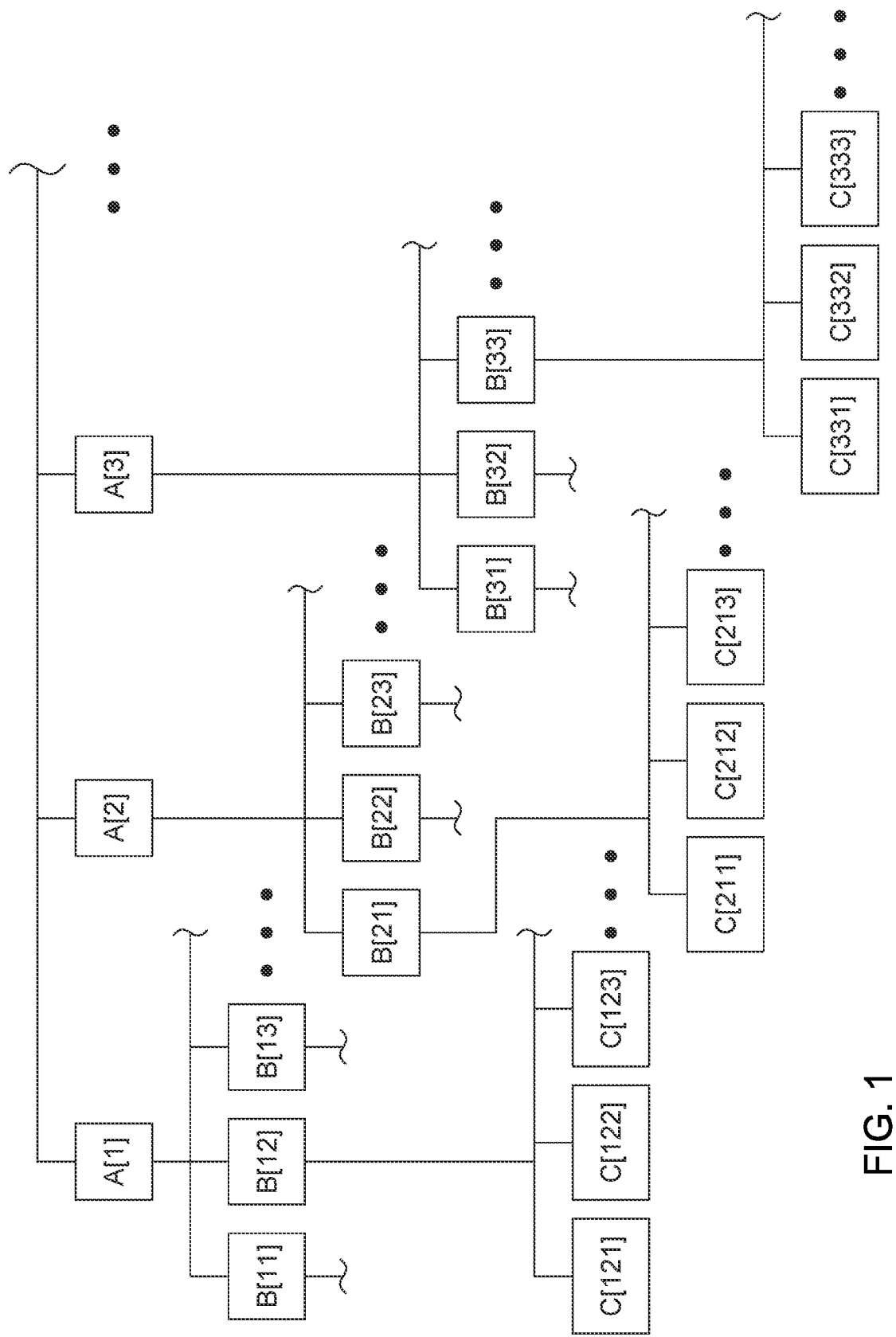
FIG. 1 illustrates schematically a three-level hierarchical arrangement of a generic example dataset.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

In many examples of an electronic dataset, the data comprise a multitude of alphanumeric data records, and each one of those data records in turn comprises a corresponding alphanumeric field value string (i.e., a field value) in each of multiple data fields. In many instances, the dataset can be organized according to a hierarchical, multilevel tree structure. The lowest level of the tree structure includes so-called terminal nodes (also referred to as "leaf" nodes in keeping with the tree analogy) that correspond to individual data records of the dataset; data fields associated with the terminal nodes are referred to as terminal-node data fields. Proceeding up the hierarchy from the terminal nodes are first-level branch nodes, and possibly second-level or even higher-level branch nodes; those data fields associated with the first-level branch nodes are referred to as first-level branch-node data fields, those associated with the second-level branch nodes (if there are second-level branch nodes) are referred to as second-level branch-node data fields, and so on for higher-level branch nodes (if any).

Each first-level branch node of such a tree structure typically represents a one-to-many relationship between (i) a single subrange of values in each one of one or more first-level branch-node data fields, and (ii) one or more terminal nodes for which the corresponding data records include field values for those first-level branch-node data fields that fall within the corresponding subrange. The data records corresponding to those terminal nodes form a first-level branch-node subset of data records, all of which have value(s) in the first-level branch-node data field(s) within the corresponding subrange(s). Each data record belongs to only one first-level branch-node subset, consistent with the arrangement of the multilevel tree hierarchy; each terminal node therefore can be said to "belong" to only one first-level branch node. Similarly, if there is a second level of branch nodes, each second-level branch node of the tree structure typically represents a one-to-many relationship between (i) a single subrange of values in each one of one or more second-level branch-node data fields, and (ii) one or more terminal nodes for which the corresponding data record include values for those second-level branch-node data fields fall within the corresponding subrange. The data records corresponding to those terminal nodes form a second-level branch-node subset of data records, all of which have value(s) in the second-level branch-node data field(s) within the corresponding subrange(s). Each first-level branch-node subset is a subset of only one second-level branch-node subset, consistent with the arrangement of the multilevel tree hierarchy; each first-level branch node therefore can be said to "belong" to only one second-level branch node. Higher-level branch node data fields and higher-level branch-node subsets can be similarly defined, if additional higher levels are present are present in the hierarchy.

A dataset of data records for all registered voters in the state of Oregon will be used repeatedly as an example in the present disclosure. The systems and methods disclosed or claimed herein are not, however, limited to that dataset or to datasets of that general type, but can be applied to any dataset in which the data can be arranged according to data structures exemplified herein. The Oregon registered voter dataset includes data records for about $1.9 \times 10^6$ individual voters (as the terminal nodes) at about $1.0 \times 10^6$ distinct addresses (as the first-level branch nodes). FIG. 1 illustrates schematically an example of a generic tree structure for organizing data into a three-level hierarchy (levels designated by A, B, and C in FIG. 1; "A"-level nodes are the second-level branch nodes, "B"-level nodes are the first-level branch nodes, and "C"-level nodes are the terminal nodes). There are several dozen possible data fields for each voter (i.e., terminal node data fields) and about 100 possible data fields for each address (i.e., first- and second-level branch-node data fields). A conventional spreadsheet or flat file database containing the Oregon registered voter dataset is about 2 GB (gigabytes) in size when stored on a computer hard disk.

All systems and methods disclosed herein are described in relation to a three-level example, but it is intended that those disclosed systems and methods can be generalized to data that is organized according to a hierarchical tree structure that includes any necessary, desirable, or suitable number of two or more levels, and that the claims shall encompass any number of levels unless explicitly limited to a specific number of levels.

One example of a three-level data hierarchy for the registered voter example might comprise streets A[x] as the second-level branch nodes, addresses B[xy] as the first-level branch nodes, and voters C[xyz] as the terminal nodes. There are streets A[1], A[2], . . . , A[x], and so on that encompass the entire dataset in this example. For each street A[x], there are addresses B[x1], B[x2], ..., B[xy], and so on that encompass that street. At each address B[xy] there are voters C[xy1], C[xy2], ..., C[xyz], and so on. Each data record comprises alphanumeric field value strings in corresponding data fields that designate the terminal node and indicate its associated attributes (i.e., field values in the terminal-node data fields labelled FC1, FC2, FC3, and so on), and can also include field value strings in corresponding data fields that (i) designate the first-level branch nodes and, if present, second- or higher-level branch nodes to which the corresponding terminal node is connected, and (ii) indicate attributes associated with those higher level nodes (i.e., field values in the first-level branch-node data fields labelled FB1, FB2, FB3, and so on; field values in the second-level branch-node data fields (if present) labelled FA1, FA2, FA3, and so on; and field values in higher-level branch-node data fields (if present)). Specific field values of a given data record are designated by, e.g., FA2(i), FB4(i,j), FC7(i,j,k), and so forth.

In the three-level hierarchical example data of FIG. 1, the data fields FA1, FA2, etc. can be referred to as second-level branch-node data fields. Each second-level branch node A[x] can be defined by specifying, for each data field FAn, a subrange of field value strings (equivalently, data values) that appear in that field in one or more data records. Note that a given subrange can comprise a single string, or a null string (i.e., no string stored in the field). Each node A[x] therefore corresponds to a second-level branch-node subset of data records in the dataset, wherein the second-level branch-node subset includes only those data records for which the field value string of each second-level data field FAn falls within the corresponding subrange. Similarly, the data fields FB1, FB2, etc. can be referred to as first-level branch-node data fields. Each node B[xy] can be defined by specifying, for each field FBm, a subrange of field value strings (equivalently, data values) that appear in that field in one or more data records (again, a given subrange can comprise a single string or a null string). Each node B[xy] therefore corresponds to a first-level branch-node subset of data records within the corresponding second-level subset, wherein the first-level subset includes only those data records for which the field value string of each first-level data field FBm falls within the corresponding subrange. Consistent with the nature of the hierarchical tree structure, each data record is included in only one first-level branch-node subset, and each first-level branch node subset is a subset of only a single second-level branch-node subset (i.e., all data records of a given first-level branch-node subset belong to the same second-level branch-node subset). The foregoing description can be generalized to third-, fourth-, or even higher-level branch nodes, data fields, and data record subsets.

A hierarchical data tree can include as many levels as needed or desired (which in some cases can vary by branch of the tree), and can include as many nodes as needed or desired at any given level. In a further example, the entire hierarchical data arrangement of FIG. 1 can itself constitute a terminal node of a larger tree structure. In addition to the registered voter example, other specific examples of data that can be advantageously organized according to hierarchical tree can include: census data, e.g., organized by state (A), county (B), tract (C), census block (D), and record (E); sales data, e.g., organized by customers (A), orders (B), and payments (C); geopolitical data, e.g., organized by continents (A), countries (B), states or provinces (C), and cities (D); geospatial data, e.g., organized by degrees (A), minutes (B), and seconds (C) of latitude and longitude; time series data, e.g., organized by year (A), month (B), day (C), hour (D), and minute (E); or combinations of different hierarchies, e.g., time series data generated by devices at different geospatial locations. Those and any other suitable examples shall fall within the scope of the present disclosure or appended claims.

For convenience of description in the present specification and claims, stored electronic indicia and the underlying data they represent may be referred to interchangeably. It should be noted that the data themselves are an abstraction, and that the representative indicia are the objects that are electronically stored, handled, arranged in a data structure, searched, retrieved, or otherwise manipulated in the methods and systems disclosed or claimed herein. Use of the term "data," "field values," and so forth in the present disclosure shall be understood to indicate the representative indicia if appropriate in a given context.

Figure 2:
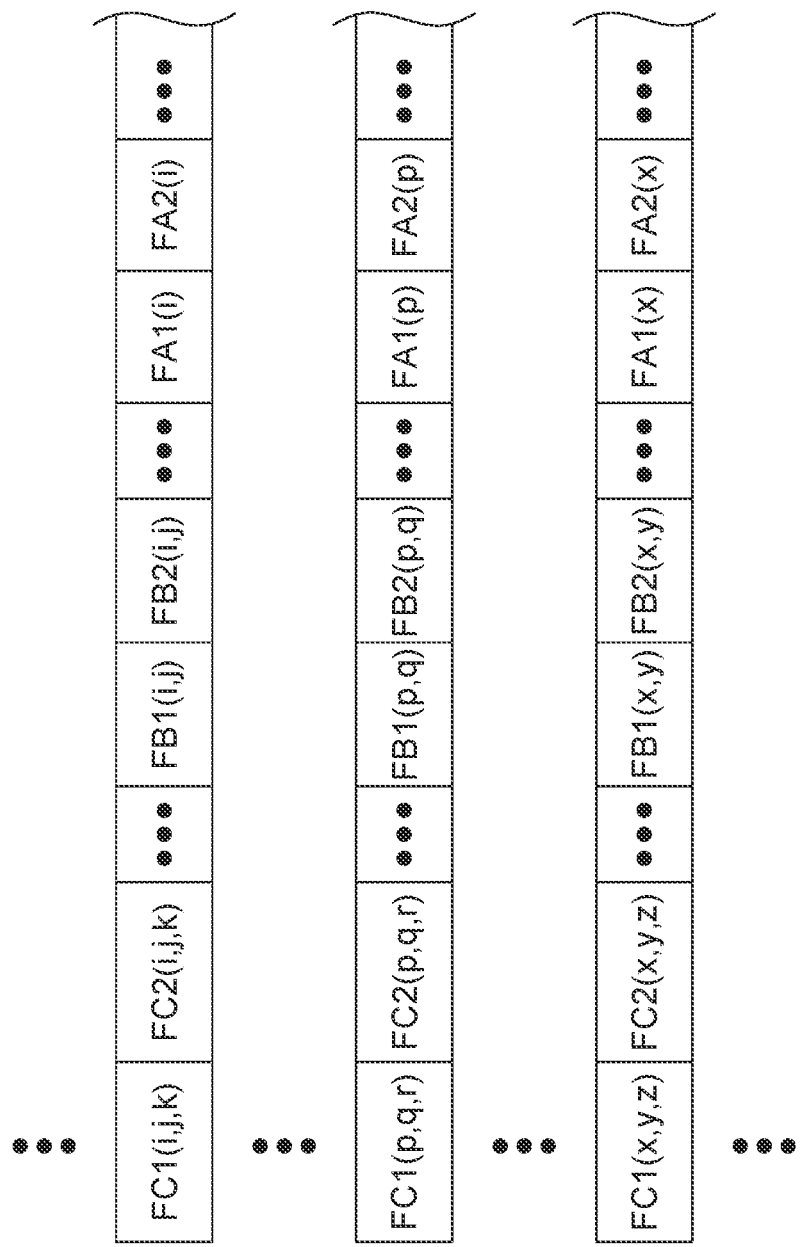
FIG. 2 illustrates schematically an example of indicia corresponding to the example dataset of FIG. 1 arranged in an example of a conventional flat file database.

As noted above, one conventional electronic data structure that can be employed to store the data represented in FIG. 1 is an electronic spreadsheet in which electronic indicia representing the data are organized into rows and columns (i.e., a flat file database, with "rows" and "columns" defined in the usual way). Several rows of such a spreadsheet are illustrated schematically in FIG. 2. Each row of the spreadsheet corresponds to one data record of the dataset, hence to one of the "leaf nodes" of the tree of FIG. 1 (e.g., C[xyz]. The columns of the spreadsheet correspond to data fields and include field values FC1(x,y,z), FC2(x,y,z), etc. for data record C[xyz], field values BF1(x,y), BF2(x,y), etc. for node B[x,y] (the corresponding first-level branch node in the hierarchy), and field values AF1(x), AF2(x), etc. for node A[x] (the corresponding second-level branch node in the hierarchy). Additional fields would be included for additional higher-level branch nodes, if present. Note that there is space reserved in the spreadsheet for every possible data field for every data record, regardless of whether a given data record has data in that field. Note also that data for branch-node data fields are repeated in each data record that corresponds to a terminal node connected to the corresponding branch node.

Figure 3:
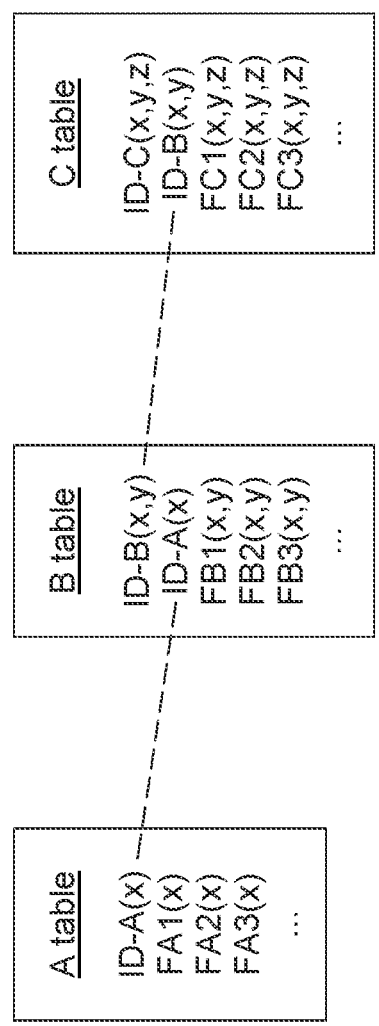
FIG. 3 illustrates schematically an example of indicia corresponding to the example dataset of FIG. 1 arranged in an example of a conventional relational database.

Another conventional electronic data structure that can be employed to store the data represented in FIG. 1 is an electronic relational database in which electronic indicia representing the data are organized into tables, as illustrated schematically in FIG. 3. Each table record in the "C" table represents a corresponding "leaf node" C[xyz] and includes an identifier field value ID-C(x,y,z), corresponding data field values FC1(x,y,z), FC2(x,y,z), etc., and an identifier field value ID-B(x,y) of the corresponding first-level branch node B[xy]. Each table record in the "B" table represents a corresponding first-level branch node B[xy] and includes an identifier field value ID-B(x,y), corresponding data field values FB1(x,y), FB2(x,y), etc., and an identifier field value ID-A(x) of the corresponding second-level branch node A[x]. Each table record in the "A" table represents a corresponding second-level branch node A[x] and includes an identifier field value ID-A(x) and corresponding data field values FA1(x), FA2(x), etc. Each table diagram of FIG. 3 is understood to represent multiple different table records of the illustrated types and contents, as is understood by those skilled in database administration. The dotted lines connecting certain fields of different tables represent one-to-many relationships established within the relational database structure (e.g., one second-level branch node A[x] to one or more first-level branch nodes B[xy]; one first-level branch node B[xy] to one or more terminal nodes C[xyz]). Note that, as with the spreadsheet data structure of FIG. 2, space is reserved for every possible field for every data record. However, unlike the spreadsheet example of FIG. 1, data fields common to multiple data records need not be stored repeatedly for every leaf node. For example, the relationship between the ID-B fields in the "B" and "C" tables enables storage of each of the FBm(x,y) field values only once, in the "B" table. The example of FIG. 3 is a relatively simple example of a relational database structure that includes only one-to-many relationships; more complicated examples might include more tables and many-to-many relationships that require so-called "pivot tables."

As noted above, conventional electronic data structures, e.g., spreadsheets and databases, offer great flexibility in terms of adding, removing, or modifying data records, establishing relationships between data fields in different records, and enabling a wide variety of sorts, searches, filters, or queries of the dataset. However, to provide such flexibility, the data structures become quite large and increasingly inefficient as the number of records in the dataset increases, partly due to the data required to define the data structure (i.e., "overhead") and partly due to space reserved for data fields that are empty. To boost speed, relational databases often include search indices, but those further increase the overall size of the data structure. The significant fraction of the impact of the large size of the data structure on the speed at which that structure can be sorted or searched arises from the manner in which large data structures are handled by the computer or server, as is described in the inline tree patents and need not be repeated herein.

Figure 4:
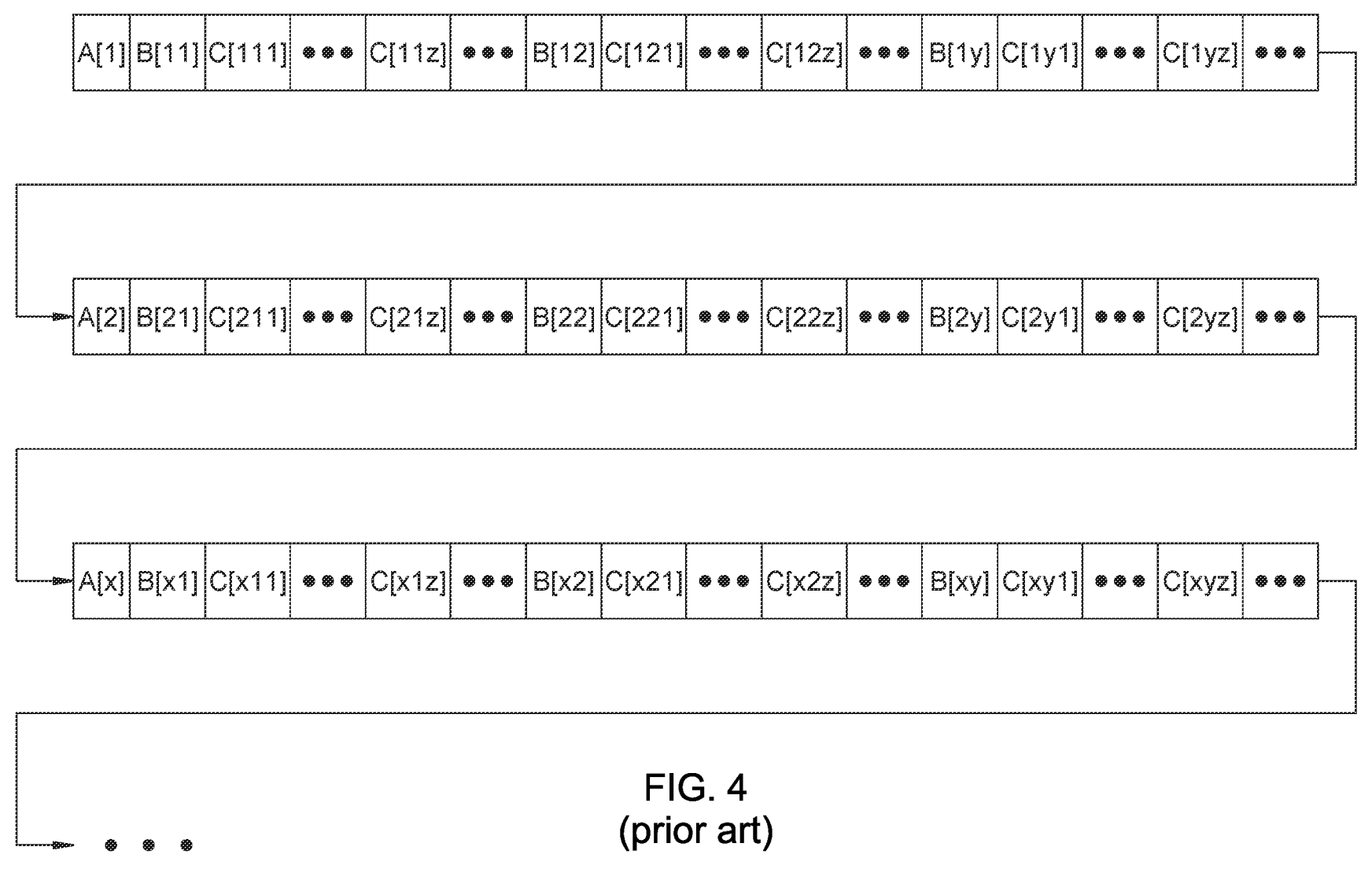

An example of an inline tree data structure arranged according to one or more of the inline tree patents is illustrated schematically in FIG. 4. Among the objectives of the data structure of FIG. 4 are (i) to enable dramatic reduction in the overall size of the stored data structure (among other reasons, to allow it to be stored in RAM in its entirety, even if it includes millions, tens of millions, or hundreds of millions of records, or more) and (ii) to reduce the number of times a given segment of the data is retrieved from RAM into the processor cache or registers (preferably reduced to a single such retrieval per data segment). For a dataset having a million records of 100 fields each, size reductions by factors of about 5 to 10 or more can be achieved and have been observed, relative to the same dataset in a conventional data structure. For simple search, sort, or filter operations on that dataset, speed enhancements by factors of about 5 to 100 or more can be achieved and have been observed, relative to similar operations performed on the same dataset in a conventional data structure.

The data structure of FIG. 4 can be referred to as an "inline tree" data structure in which the branches and leaves of the tree of FIG. 1 are separated and arranged sequentially. There is no row/column arrangement as in a spreadsheet, nor is there any table arrangement as in a relational database. The data structure of FIG. 4 can be regarded as a single, long, continuous ordered sequence of binary strings (i.e., a single line of binary digits). Each binary string within the ordered sequence represents a corresponding alphanumeric string in a data fields in the underlying dataset in a way that reduces their size. The binary strings are also arranged so as to increase the likelihood (i) that when one data segment is pulled into the processor cache for processing, the next segments to be processed have been pulled in along with it, and (ii) that all fields in that segment will be processed after it is first pulled into the processor cache, so that it does not need to be pulled into the processor cache again.

The general arrangement of the inline tree data structure as disclosed in the inline tree applications is illustrated schematically in FIG. 4 (although there is some variation in terminology between those patents and the present disclosure). Each block in the diagram corresponds to a substantially contiguous set of binary strings, each set representing one or more branch-node data field values or terminal-node data field values of the underlying data records. For example, the terminal-node binary string sets labeled C[xyz] (i.e., C[111], C[112], etc.) include binary strings representing the values in one or more data fields FC1(x,y,z), FC2(x,y,z), etc. for each corresponding data record (i.e., for each corresponding terminal node). Similarly, the first-level branch-node binary string sets labeled B[xy] (i.e., B[21], B[22], etc.) include binary strings representing the values in one or more data fields FB1(x,y), FB2(x,y), etc., for the corresponding first-level branch-node subsets of the data records, and the second-level branch-node binary string sets labeled A[x] (i.e., A[1], A[2], etc.) include binary strings representing the values FA1(x), FA2(x), etc. in one or more second-level data fields FA1 data fields etc. for the corresponding second-level subsets of the data records.

In the example of FIG. 4, the binary string sets A[x], B[xy], and C[xyz] can be arranged in the inline tree so that each second-level branch-node subset of data records is represented by binary indicia that comprise a corresponding substantially contiguous second-level branch-node binary string sequence, e.g., all of the binary string sets A[1], B[1y], and C[1yz] together form a first substantially contiguous second-level branch-node binary string sequence that represents a first corresponding second-level branch-node subset of data records, all of the binary string sets A[2], B[2y], and C[2yz] together form a second corresponding substantially contiguous second-level branch-node binary string sequence that represents a different, second corresponding second-level branch-node subset of the data records, and so on. Each second-level branch-node binary string set A[x] can act as a header for its corresponding substantially contiguous second-level branch-node binary string sequence.

Within each second-level branch-node binary string sequence in the example of FIG. 4, the binary string sets B[xy] and C[xyz] are arranged in the inline tree so that each first-level branch-node subset of data records is represented by binary indicia that comprise a corresponding substantially contiguous first-level binary string sequence, e.g., all of the binary string sets B[11] and C[11z] together form a corresponding substantially contiguous first-level binary string sequence that represents a corresponding first-level subset of data records, all of the binary string sets B[23] and C[23z] together form a different substantially contiguous second-level binary string sequence that represents a different corresponding first-level subset of the data records, and so on. Each first-level branch-node binary string set B[xy] can act as a header for its corresponding substantially contiguous first-level binary string sequence. Some of the effects of the contiguous arrangement of the binary string sequences is discussed further in the inline tree patents, and need not be repeated here. To search or filter the data records of the dataset, a search or filter program traverses some or all of the inline tree, interrogating the binary strings for each selected field against selected search or filter criteria. Details are disclosed in the inline tree application, and need not be repeated herein.

In the example of FIG. 4, the inline tree can include binary strings encoding field values for multiple fields; in some examples field values for all fields are thus encoded, while in other examples values are encoded in the binary strings for only certain fields selected to be filterable for that dataset. As noted earlier, a large dataset can include dozens or hundreds of fields (or more) for each data record. In some instances, e.g., when a large number of fields are included in a given search or filter query, the arrangement of FIG. 4 can be an optimum arrangement for enabling fast searching and filtering for large datasets. However, interrogating the inline tree of FIG. 4 to search or filter the data records includes, for each binary string in the inline tree, a determination of the size of that binary string (based on the field it represents) so that it can be properly interpreted (if the corresponding field was part of the query) or properly skipped over (if the corresponding field was not part of the query). If has been observed that in some instances (e.g., when only one or two or a handful of fields are included in a given search or filter query), the necessary string-by-string size determination consumes a significant fraction of the computation time expended. In other words, when only a few fields are included in a query, a search or filter program tends to spend much (perhaps most) of its computation time determining just how to skip over binary strings of FIG. 4 that encode values for fields that are irrelevant to the particular query. It would be desirable to achieve further speed gains (e.g., beyond those achieved by the methods of the inline tree patents) for search or filter queries wherein only a handful of fields are included, out of dozens or hundreds of fields in the dataset. The inventive data structures disclosed herein achieves such speed gains in those circumstances.

Figure 5:
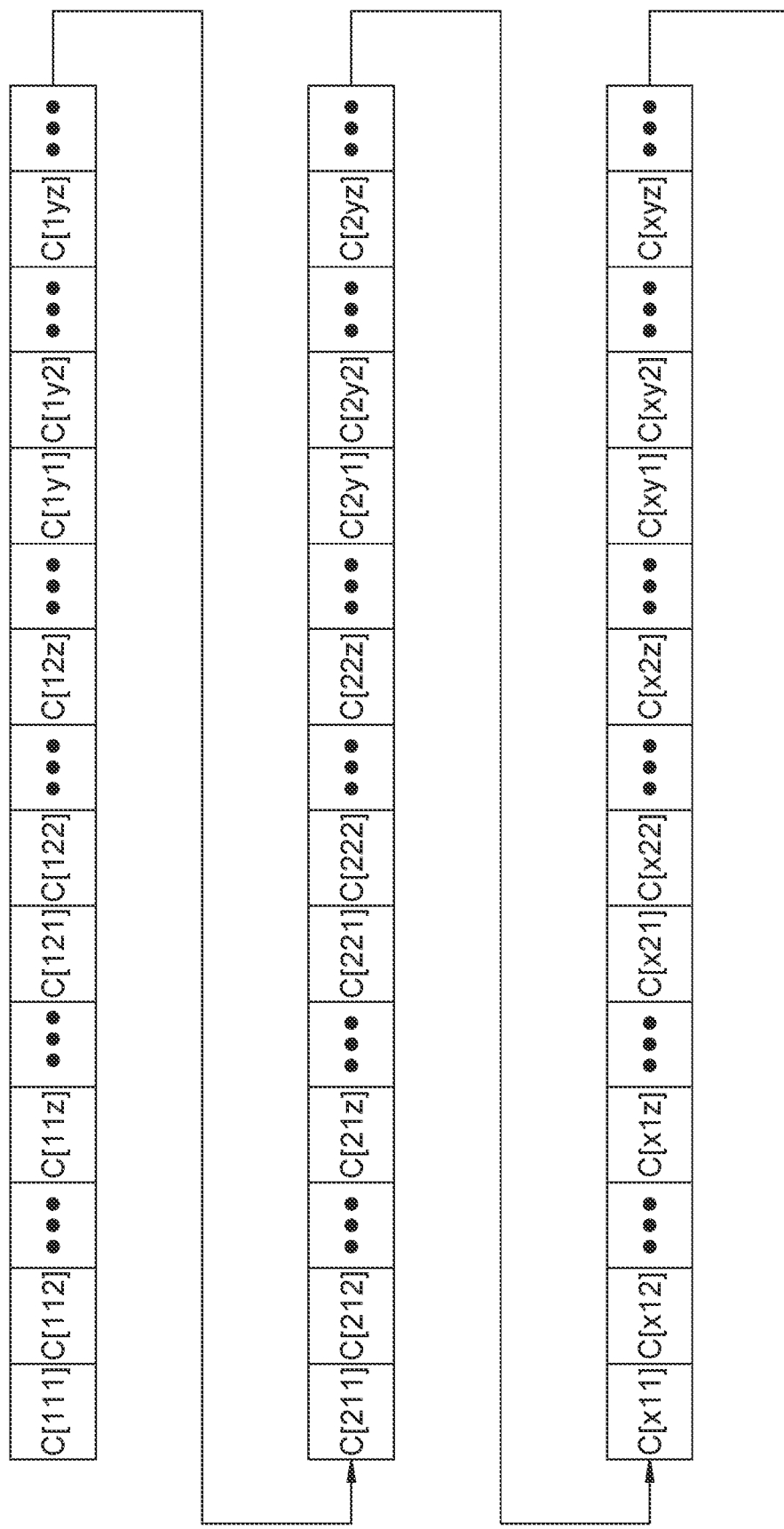
FIG. 5 illustrates schematically an example of a stripped inline tree data structure of an inventive storage arrangement for the example dataset of FIG. 1.

FIG. 5 illustrates schematically an inventive data structure referred to in the Description as a "stripped inline tree," but recited in the Claims as an "inline tree data structure" with additional limitations recited therein to define its "stripped" nature. Briefly, the inventive inline tree data structure is referred to as "stripped" because (i) it includes no encoding or representation of any branch-node data field value and includes no branch-node binary strings, and (ii) in its most basic form (i.e., its most "stripped" form), it includes no terminal-node binary strings that represent or encode any terminal-node data field values.

The stripped inline tree comprises an ordered sequence of terminal-node binary strings C[xyz] representing the terminal nodes of the hierarchical tree, i.e., representing the data records of the dataset. Unlike the inline tree of FIG. 4, however, the stripped inline tree of FIG. 5 includes no binary strings that correspond to the first-, second-, or higher-level branch nodes, and encodes or represents no branch-node data field values. The terminal-node binary strings C[xyz] are nevertheless arranged in the stripped inline tree of FIG. 5 in the same order as in the inline tree of FIG. 4. More specifically, in the example of FIG. 5, the terminal-node binary strings C[xyz] are arranged in the stripped inline tree so that each second-level branch-node subset of data records is represented by binary indicia that comprise a corresponding single substantially contiguous second-level branch-node binary string sequence within the stripped inline tree, e.g., all of the terminal-node binary strings C[1yz] together form a first substantially contiguous second-level branch-node binary string sequence that represents a first corresponding second-level branch-node subset of data records, all of the terminal-node binary strings C[2yz] together form a second corresponding substantially contiguous second-level branch-node binary string sequence that represents a different, second corresponding second-level branch-node subset of the data records, and so on. Within each second-level branch-node binary string sequence in the example of FIG. 5, the terminal-node binary strings C[xyz] are arranged in the stripped inline tree so that each first-level branch-node subset of data records is represented by binary indicia that comprise a corresponding substantially contiguous first-level binary string sequence, e.g., all of the terminal-node binary strings C[11z] together form a corresponding substantially contiguous first-level binary string sequence that represents a corresponding first-level subset of data records, all of the terminal-node binary strings C[54z] together form a different substantially contiguous second-level binary string sequence that represents a different corresponding first-level subset of the data records, and so on.

Omission of branch-node binary strings representing branch-node data field values is one point of distinction between the inventive stripped inline tree of FIG. 5 and the inline tree of FIG. 4. Another distinction is that the binary strings need not encode or represent any values for the terminal-node data fields. The primary purpose of the stripped inline tree is not to encode or represent the data, but to act as a guide through the tree structure of the data; the stripped inline tree can be thought of as encoding the "topology" of the hierarchical tree structure of the dataset (the term "topology" being used loosely, of course). Each given terminal-node binary string C[xyz] includes an indicator binary string (sometimes referred to as a "sentinel" string) that indicates one of the following: (i) the terminal-node binary string and an immediately adjacent terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure. If higher-level data fields are present, the indicator string can further indicate (ii') the respective data records are in first-level branch-node subsets different from each other but are not in different higher-level branch-node subsets, or (ii") a highest level among the branch-node subsets, higher than the first level, at which the respective data records also are in higher-level branch-node subsets different from each other. In some examples, for all of the terminal-node binary strings except the first, the adjacent terminal-node binary string is the immediately preceding terminal-node binary string; in other examples, for all of the terminal-node binary strings except the last, the adjacent terminal-node binary string is the immediately succeeding terminal-node binary string. In the former examples (i.e., in which each terminal-node binary string refers to the preceding string), typically there would be no terminal-node binary string indicating it was the last string; a search program would be provided with a total number of data records in the dataset to determine an end of a search. In the latter examples (i.e., in which each terminal-node binary string refers to the next string), the "last string" string can act as an indicator to determine the end of a search; such an example is discussed below, but the present disclosure and appended claims shall be construed as encompassing both scenarios unless explicitly limited to one or the other.

One portion of a search or filter program includes traversing the ordered sequence of terminal-node binary strings C[xyz] of the stripped inline tree and determining at each step, based on the indicator string, where in the hierarchical dataset is the data record represented by the current terminal-node binary string. All of the terminal-node binary strings C[xyz] are the same length, so that the search or filter program need not include any determination of the size of the next binary string in the stripped inline tree. Because of the constant size among the terminal-node binary strings, a significant computational burden is removed from the traversal of the stripped inline tree of FIG. 5, relative to traversal of the inline tree of FIG. 4. For search or filter operations in which only a handful data fields out of many are queried in any single search query, the reduction in computation time can a factor of 2 or 3, or even 10 or 20 or more, depending on the number of fields queried relative to the total number of fields stored.

In contrast with the data structure of the inline tree patents and FIG. 4, in the inventive data structure the actual field values for the data records are stored or encoded in one or more (often many more) auxiliary data structures, typically flat files, spreadsheets, or alphanumeric or binary arrays (e.g., as in FIGS. 6A through 6C for a three-level hierarchy, or as in only FIGS. 6B and 6C for a two-level hierarchy). The terms "array" or "auxiliary array" used herein shall encompass any suitable auxiliary data structure, including those listed, for storing, representing, or encoding field values for the data records of the dataset. In instances wherein only a handful of data fields will be included in any one query, it can be advantageous to store the field values for each data field, or sets of only a few data fields, in a corresponding separate flat file or array. Many such arrays can be employed to store field values for a large number of defined data fields. For each query, only those arrays corresponding to the queried fields need to be loaded into memory and interrogated. No processor time or computation resources are needed to skip over field values that are not pertinent to the query; no computer memory (RAM or processor cache) is occupied by field values that are not pertinent to the query. Both of those result in significant speed enhancement or reduced hardware requirements for providing searches of a given dataset.

The field values for the terminal-node data fields are stored or encoded in a set of one or more terminal-node auxiliary arrays (FIG. 6C), arranged, indexed, or otherwise accessible in the same order as the corresponding terminal-node binary strings are ordered in the stripped tree of FIG. 5. The field values for the first-level branch-node data fields are stored or encoded in a set of one or more first-level branch-node auxiliary arrays (FIG. 6B), arranged, indexed, or accessible in the same order as the corresponding contiguous first-level branch-node binary string sequences are ordered in the stripped tree of FIG. 5. If second- or higher-level branch-node data fields are present, the corresponding field values are stored or encoded in corresponding set(s) of one or more second- or higher-level branch-node auxiliary arrays (FIG. 6A), arranged, indexed, or accessible in the same order as the corresponding contiguous second- or higher-level branch-node binary string sequences are ordered in the stripped tree of FIG. 5. Each array can store values for only a single data field, or for a set of multiple data fields. If field values for multiple data fields are stored together in a single array, they can be grouped in any suitable, desirable, or necessary way. In some examples, fields that are frequently searched together (e.g., latitude and longitude; age, sex, and marital status) can be stored together in the same array. In some examples, somewhat arbitrary groupings of data fields might be employed to "pad out" array entries to an integer number of bytes per array element (e.g., eight one-bit field values, which may or may not be logically related to one another, might be stored together so that each array element consists of a whole byte); such an arrangement typically improves speed or efficiency of storage of the array, of loading of the array into memory (e.g., RAM or processor cache), or of interrogating the array during a search.

In any case, dividing the field values among many arrays enables selective loading of only those arrays needed for a particular search query into memory. Depending on the search query, significant speed gains, and reduced hardware requirements, result from that selective loading and the concomitant reduced memory requirements (RAM or processor cache) for loading the "entire" dataset into memory for a given search query (i.e., loading field values for every data record, but for only a reduced set of fields that includes those fields involved in the given search query). For example, if a search is performed for voters within a certain age range (a terminal-node data field in the Oregon voter example), within a certain congressional district (a first-level branch-node data field), and a particular political party affiliation (another terminal-node data field), then only the arrays that encode those three data fields need to be loaded into memory for performing the search. The other dozens (or even hundreds) of fields need not be loaded.

The data field values can be stored or encoded according to any suitable, desirable, or necessary format or protocol; those formats or protocols can be the same for all arrays, or can differ among the multiple arrays. In some examples, the raw alphanumeric representation of the data field values, or an encoding thereof such as ASCII, can be stored in the arrays. In other examples, standard techniques such as string indexing or string interning can be employed to encode alphanumeric data field values as binary numerical indices. Typically, some sort of master string table is employed to relate the string indices stored in an array to the data field values they represent. In other examples, field values from multiple data fields that are relatively constrained (e.g., multiple address-related data fields in the voter example, such as city, congressional district, school district, and so forth, that cannot appear in arbitrary combinations) can be replaced by a so-called clump index, resulting in substantial reduction in space requirements for storage. Typically, some sort of clump index table is employed to relate a clump index stored in an array to the corresponding set of field values. Both of those techniques (string indexing and data clumping) are described extensively in the inline tree patents, and those descriptions need not be repeated herein.

A search or filter operation that is performed on the inventive data structure, with a computer processor programmed therefor, operates as follows: (i) a set of selected queried data fields is received; (ii) a set of one or more search criteria are received (i.e., corresponding queried field subranges are selected for each selected queried data field); (iii) the terminal-node binary strings of the stripped inline tree are interrogated in order, and, in parallel, one or more of the auxiliary data structures corresponding to the selected queried data fields are interrogated in the same order; and (iv) based on the interrogation of the one or more auxiliary data structures, data records are identified that fulfill, meet, or match the search criteria.

Figure 7:
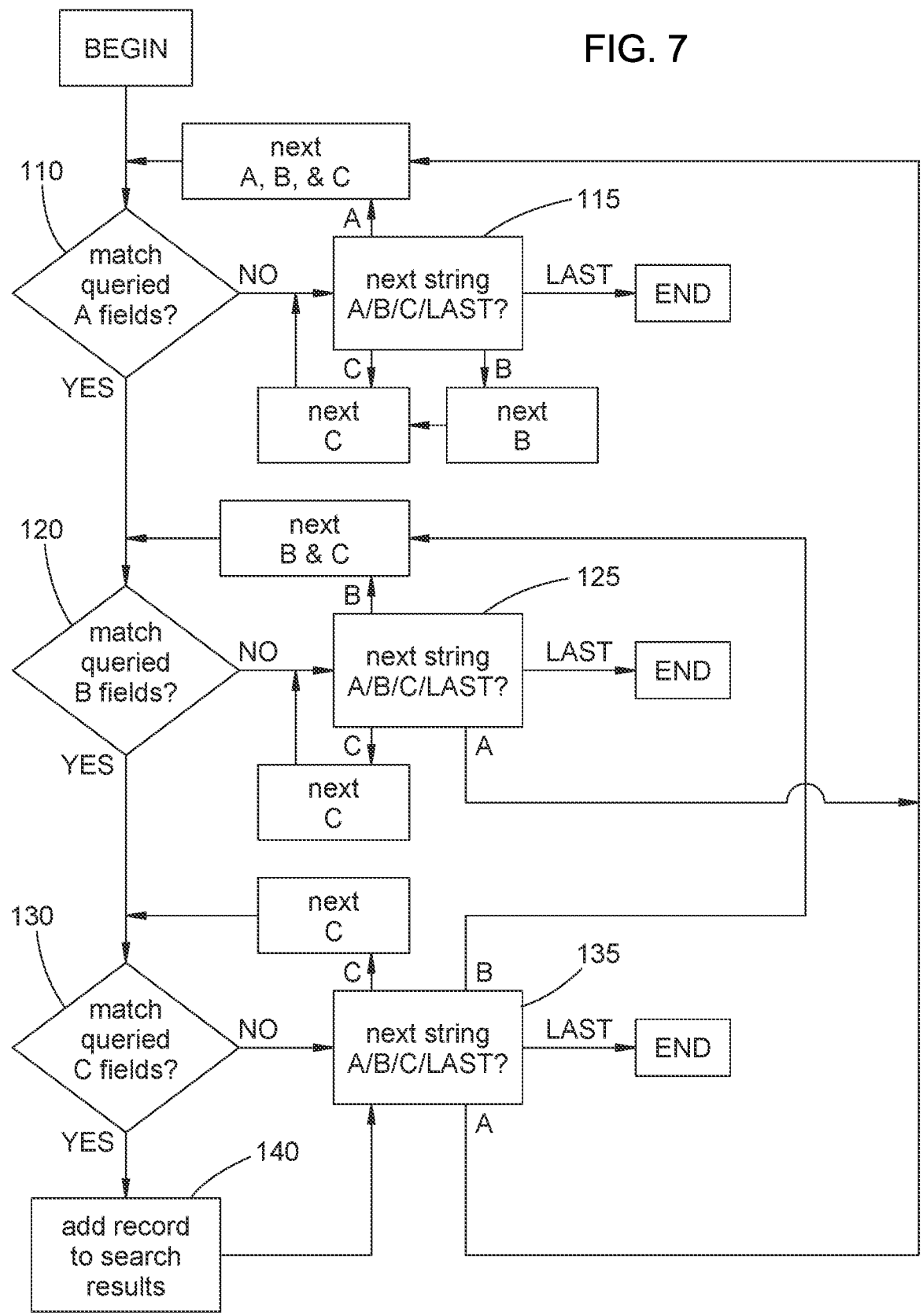
FIG. 7 is a flow diagram of an example method for querying the dataset stored according to the example inventive arrangements of FIGS. 5, 6A, 6B, and 6C.
Figure 8:
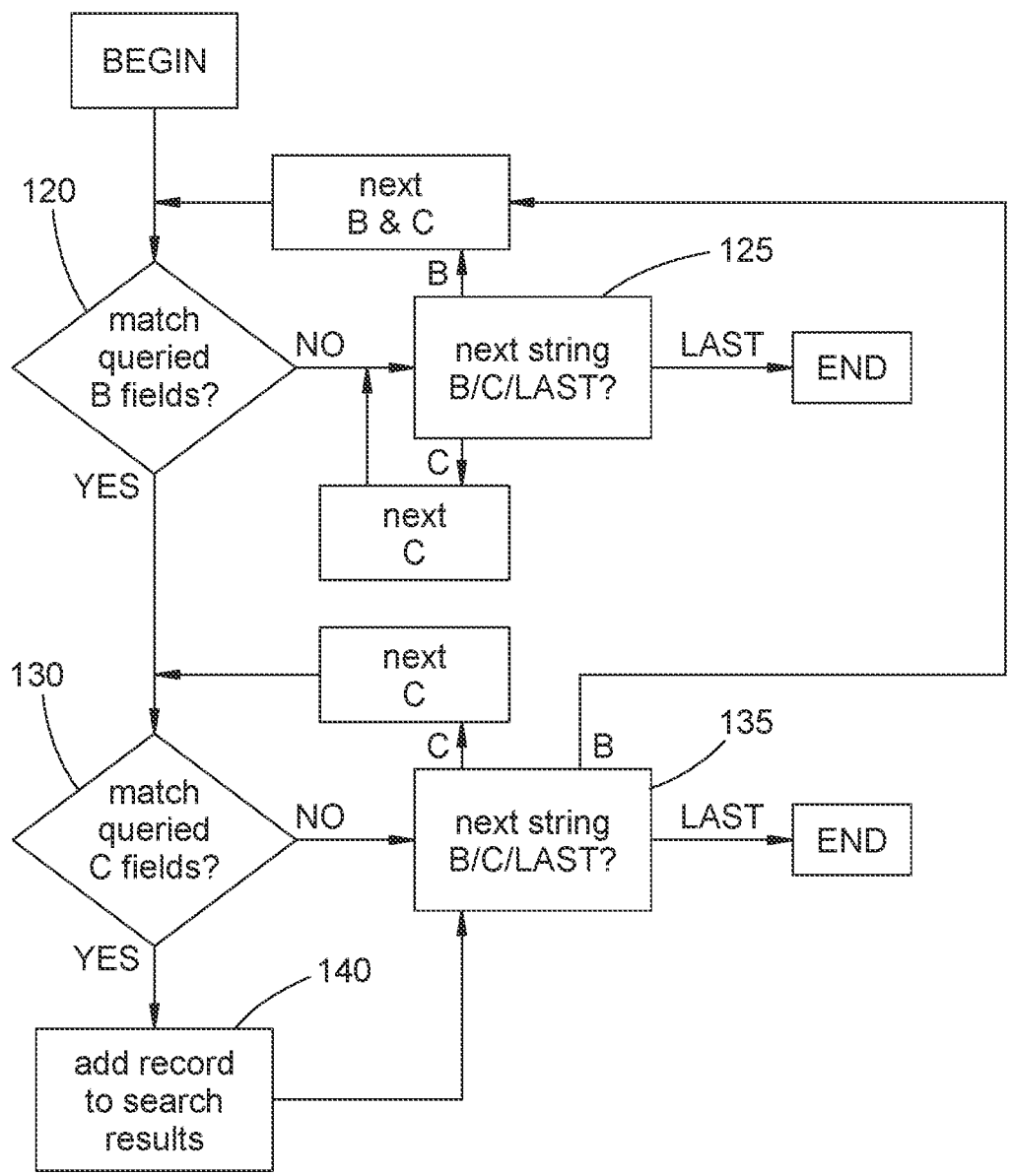
FIG. 8 is a flow diagram of an example method for querying a dataset stored according to the example inventive arrangements FIGS. 5, 6B, and 6C.

An example of a search method is illustrated by the flowchart of FIG. 7. In this example, the dataset is organized into a three-level tree structure comprising second- and first-level branch nodes (i.e., the A-level and B-level branch nodes, respectively) and terminal nodes (i.e., the C-level nodes, which correspond to individual data records). The search method of FIG. 7 can be modified or generalized as needed to a hierarchical tree dataset having any number of two or more levels (e.g., a two-level example is illustrated by the flowchart of FIG. 8, and the following descriptions of FIG. 7 also apply to FIG. 8 as appropriate). In an example of performing the method illustrated in FIG. 7 in a three-level dataset, a search query can include selected queried data fields at all three levels of the hierarchy. In other words, the most general search query specifies: (i) one or more selected second-level queried data fields (i.e., A-level data fields) and a corresponding field value query subrange for each selected second-level queried data field; (ii) one or more selected first-level queried data fields (i.e., B-level data fields) and a corresponding field value query subrange for each selected first-level queried data field; and (iii) one or more selected terminal-node queried data fields (i.e., C-level data fields) and a corresponding field value query subrange for each selected terminal-node queried data field. In response to the search query, the terminal-node, first-level, and second-level arrays corresponding to the selected queried data fields are loaded into memory. In other example methods, the search query might not include queried data fields at all levels of the hierarchy. Some example search queries can include only terminal-node queried data fields, only first-level branch-node queried data fields, only higher-level branch-node queried data fields, queried data fields at only two levels of the hierarchy, and so on.

Upon receipt of the query, the ordered sequence of the terminal-node binary strings of the inline tree data structure is automatically interrogated (e.g., at 115, 125, and 135 in the flowchart of FIG. 7, or 125 and 135 in the flowchart of FIG. 8), using a computer processor programmed therefor, to determine the corresponding indicator string. In this example, the indicator string indicates: (i) the next data record is in the same first-level branch-node subset (e.g., "C" branch at 115/125/135 of FIG. 7 or at 125/135 of FIG. 8), (ii) the next data record is in a different first-level branch-node subset but not in different higher-level branch node-subset (which includes the case wherein there is no higher-level subset; e.g., "B" branch at 115/125/135 of FIG. 7 or 125/135 of FIG. 8), or (iii) the highest level among higher-level branch-node subsets at which the next data records differs (e.g., "A" branch at 115/125/135 of FIG. 7; not applicable to FIG. 8).

In parallel with interrogation of the inline tree, and in the corresponding order, field value strings are automatically interrogated (e.g., at 110, 120, or 130 in the flowchart of FIG. 7, or at 120 or 130 in the flowchart of FIG. 8), using a computer processor programmed therefor, only among those one or more auxiliary data structures that include field value strings of the selected queried data fields. Data records that satisfy (i.e., fulfill, meet, or match) the search query are identified by the interrogation of the one or more auxiliary data structures and added to the search results at 140 (i.e., added to a list or enumeration of data records satisfying the search query). By interrogating only those auxiliary data structures that include data field values pertinent to the search query, significant reductions in memory used (e.g., RAM or processor cache) or in search time required can be achieved. Which, if not all, of those field values are interrogated for each data record is determined in part by the indicator string read from the inline tree structure. For example, at 135 of FIG. 7, the indicator string from the inline tree data structure determines which fields are interrogated in the next data record, i.e., the "A" branch leads to A-level queried field values being interrogated, the "B" branch leads to B-level queried field values being interrogated, while the "C" branch leads to C-level queried field values being interrogated.

Note that if a given search query does not include queried data fields at a given level of the hierarchy, then all data records are deemed to match queried fields at that level of the hierarchy, and that the term "interrogating" the corresponding field values includes determining that there are no queried data fields at that level of the hierarchy. In some examples, a search query that includes no A-level queried data fields will always follow the "YES" branch at 110 in FIG. 7; in some examples, a search query that includes no B-level queried data fields will always follow the "YES" branch at 120 in FIG. 7 or 8; in some examples, a search query that includes no C-level queried data fields will always follow the "YES" branch at 130 in FIG. 7 or 8. In the first two of those examples, if corresponding dynamic program code is generated on-demand in response to a given search query, the one or more of the corresponding decision points 115 or 125 can be omitted entirely from the generated program code.

Further reductions in search time required can be achieved. For each first-level branch-node field value that does not satisfy the search query (i.e., "NO" branch from 120 in FIG. 7 or 8), the terminal-node data fields (C-fields) of the corresponding first-level branch-node subset of the data records can be omitted from the interrogation ("C" branch from 125 in FIG. 7 or 8). The search program loops through 125 without interrogating any field values until an indicator string is reached that indicates a different first-level branch-node subset ("B" branch from 125 in FIG. 7 or 8). The search program proceeds by interrogating the next B-level queried data fields at 120. Similarly, for each higher-level branch-node field value that does not satisfy the search query (i.e., "NO" branch from 110 in FIG. 7; not applicable in FIG. 8), first-level and terminal-node data fields (B- and C-fields) of the corresponding second-level branch-node subset of the data records can be omitted from the interrogation ("B" and "C" branches from 115 in FIG. 7). The search program loops through 115 without interrogating any field values until an indicator string is reached in the inline tree that indicates a different second-level branch-node subset ("A" branch from 115 in FIG. 7). The search program proceeds by interrogating the next A-level queried data fields at 110. Significant computing time is saved by omitting those interrogations. In some examples in which so-called in-time compiling of the search query is employed, corresponding portions of the flowcharts of FIG. 7 or 8 can be entirely omitted, if no data fields at the corresponding level of the hierarchy are selected for querying.

As noted above, the indicator strings of the inline tree data structure are used by the search program (at 115, 125, and 135 of FIG. 7; at 125 and 135 of FIG. 8) to properly navigate through the hierarchical organization of the data records and to reduce unnecessary interrogations of data field values. Note that at any of 115/125/135, if the "LAST" indicator string is encountered, the search is complete (i.e., the entire dataset has been searched). The search program automatically generates, with a computer processor programmed therefor, a list or an enumeration of data records that are identified in the course of the various interrogations described above as fulfilling, meeting, or matching the search query. The list or enumeration constitute the results of the search.

Progress of the search program can be controlled, e.g., simply by moving from one array element to the next in the auxiliary data structures, or from one binary string to the next in the inline tree data structure. Instead or in addition, any suitable one or more counters, indicators, indices, or pointers can be employed in any suitable way, and are incremented or moved as the search program progresses through the inline tree and auxiliary data structures.

The search (sometimes also referred to as filtering) process typically is embodied as a computer program operating on one or more computers, computer systems, or servers, which include one or more processors and include or are otherwise operatively coupled to one or more computer-readable media of any suitable type. The computers, systems, or servers that perform the search or filtering functions need not be, and often are not, the same as those that performed the data conversion process that produced the inline tree and auxiliary data structures from the original dataset. In both cases (convert and search/filter), the computer, server, or system can be a stand-alone machine or can comprise one or machines connected by a local- or wide-area network (LAN or WAN) or the Internet. Any suitable hardware or hardware-plus-software implementation can be employed for searching or filtering.

For conversion of the original dataset, its data fields are examined for determining a suitable hierarchical arrangement for the data structure. In some instances, a suitable choice will be readily apparent, e.g., if the original dataset is arranged in a series of data tables arranged as a series of one-to-many relationships (as in FIG. 3). In other instances, several choices for a suitable hierarchy might be possible, and one might be selected on the basis of the nature of searches to be performed (e.g., choosing streets as the highest level nodes in the voter data example lends itself to geographic searching or filtering). In an exemplary sales dataset, organizing the dataset with customers as the highest-level nodes might facilitate searching and filtering based on customer-related data fields, while organizing the dataset with products as the highest-level nodes might facilitate searching or filtering based on product-related data fields. Once the hierarchy is selected and defined, data fields can be distributed in any suitable, desirable, or necessary way among one or more auxiliary data structures, using any suitable, desirable, or necessary storage format or encoding scheme (e.g., string interning, data clumping, and so forth). An advantage of the dataset storage arrangement according to the present disclosure, over those of the inline tree patents, is that new data records to the dataset, or additional data fields can be added to existing records of the dataset, can be added more easily. Because all binary strings of the stripped inline tree are the same length, the location for insertion of a new data records can be readily ascertained. Similarly, the position in an auxiliary array can be readily ascertained for insertion of field values of a new data record. New data fields can be added to existing data records by simply adding another auxiliary data structure.

In its most "stripped" form, each terminal-node binary string of the inline tree data structure includes only the indicator string. However, in some examples each terminal-node binary string can include, along with the indicator string, a data string encoding one or more data field values of the corresponding data record. To preserve the speed advantage provided by the stripped inline tree, the same data fields must be encoded by the data string for all data records, and the corresponding field values must be encoded so that the resulting data strings (and so also the terminal-node binary strings) are the same length as one another. In other words, the additional data field values encoded in the stripped inline tree should not require any string-by-string determination of length or decision as to the contents of each string. Data field values encoded in the stripped inline tree can be advantageous for data fields that almost always appear in searches of the dataset, e.g., spatial coordinates of spatially linked data, or a time index of time series data.

In preparation for searching or filtering, the stripped inline tree data structure and the one or more auxiliary data structures determined to be pertinent to a given search query can be loaded into one or more computer-readable media that are directly accessible to a computer processor, e.g., computer or server RAM, or processor cache. A computer system of any suitable type or configuration can be structured and connected to perform any of the preceding methods. An article comprising a tangible medium can encode computer-readable instructions that, when applied to a computer system, instruct the computer system to perform any of the preceding methods. An article comprising one or more tangible computer-readable media can be encoded to store the inline tree data structure and the one or more auxiliary data structures generated by any of the preceding methods. An article comprising a tangible computer-readable medium can be encoded to store electronic indicia of the list or enumeration generated by any of the preceding methods.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in temporary or permanent storage or in replaceable media, such as by including programming in microcode, machine code, network-based or web-based or distributed software modules that operate together, RAM, ROM, CD-ROM, CD-ft CD-R/W, DVD-ROM, DVD±R, DVD±R/W, hard drives, thumb drives, flash memory, optical media, magnetic media, semiconductor media, or any other one or more suitable, presently extant or future-developed, tangible, non-transitory storage media. One or more binary data files embodying the inline tree data structure or the one or more auxiliary data structures also can be stored on any one or more suitable, presently extant or future-developed, tangible, non-transitory computer-readable storage media, including those listed above.

In addition to the preceding, the following examples fall within the scope of the present disclosure or appended claims:

Example 1. An article comprising one or more tangible, non-transitory computer-readable storage media encoded to store electronic indicia of a dataset, said electronic indicia comprising an inline tree data structure and one or more auxiliary data structures, wherein: (a) the dataset comprises a multitude of data records, and each data record includes field value strings for multiple corresponding defined data fields; (b) the defined data fields include terminal-node data fields and first-level branch-node data fields, and the first-level branch-node data fields define a hierarchical tree relationship among subranges of field value strings of the first-level branch-node data fields, which subranges correspond to multiple first-level branch-node subsets of the data records of the dataset; (c) each first-level branch-node subset includes data records for which field value strings of first-level branch-node data fields fall within the corresponding subrange; (d) the inline tree data structure comprises an ordered sequence of only terminal-node binary strings, wherein (1) there is a one-to-one correspondence between the terminal-node binary strings and the data records of the dataset, (2) the terminal-node binary strings have the same length as one another, and (3) each terminal-node binary string includes an indicator string that indicates, for each terminal-node binary string, that (i) the terminal-node binary string and an immediately adjacent terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure; (e) for each first-level branch-node subset, the corresponding terminal-node binary strings form a single contiguous string sequence within the inline tree data structure; and (f) the one or more auxiliary data structures include electronic indicia of field value strings of the data records of the dataset arranged, indexed, or accessible in the same order as the ordered sequence of terminal-node binary strings in the inline tree data structure.

Example 2. The article of Example 1 wherein, for each terminal-node binary string, the indicator string indicates that (i) the terminal-node binary string and the immediately succeeding terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure.

Example 3. The Example of claim 1 wherein, for each terminal-node binary string, the indicator string indicates (i) the terminal-node binary string and the immediately preceding terminal-node binary string in the ordered sequence correspond to respective data records that are both in the same first-level branch-node subset, or (ii) the respective data records are in first-level branch-node subsets different from each other but are not in different higher-level branch-node subsets.

Example 4. The article of any one of Examples 1 through 3 wherein each terminal-node binary string of the inline tree data structure includes only the corresponding indicator string and excludes any data string encoding a field value of the corresponding data record.

Example 5. The article of any one of Examples 1 through 3 wherein each terminal-node binary string of the inline tree data structure includes a data string encoding one or more field values of the corresponding data record.

Example 6. The article of Example 5 wherein each data string includes one or more data field values encoded by string interning.

Example 7. The article of any one of Examples 1 through 6 wherein one or more of the auxiliary data structures includes one or more data field values encoded by string interning.

Example 8. The article of any one of Examples 1 through 7 wherein one or more of the auxiliary data structures includes one or more clump data field values that encode a set of multiple clumped data field values.

Example 9. The article of any one of Examples 1 through 8 wherein with inline tree data structure is stored in computer random access memory or in processor cache memory.

Example 10. A computer-implemented method for generating the article of any one of Examples 1 through 9, the method comprising: (A) receiving at a computer system or reading from one or more computer-readable storage media first electronic indicia of the dataset; (B) using one or more electronic processors of the computer system that are programmed therefor and operatively coupled to the one or more storage media, generating second electronic indicia of the dataset, the second electronic indicia comprising (1) the inline tree data structure and (2) the one or more auxiliary data structures; and (C) storing the inline tree data structure and the one or more auxiliary data structures on the one or more tangible, non-transitory computer-readable storage media that are operatively coupled to the one or more electronic processors of the computer system.

Example 11. A computer system structured, connected, and programmed to perform the method of Example 10.

Example 12. An article comprising one or more tangible, non-transitory computer-readable storage media encoding computer-readable instructions that, when applied to a computer system, instruct the computer to perform the method of Example 10.

Example 13. A computer-implemented method for interrogating the inline tree data structure and the one or more auxiliary data structures encoded on the article of any one of Examples 1 through 9, wherein the method comprises: (A) receiving at a computer system a search query for data records of the dataset that include, for each one of one or more selected queried data fields among the defined data fields of the dataset, a corresponding field value that falls within a corresponding queried field value subrange; (B) automatically, with a computer processor programmed therefor, interrogating, in order, the ordered sequence of the terminal-node binary strings of the inline tree data structure to identify the corresponding indicator strings; (C) as each terminal node binary string is interrogated in part (B), automatically interrogating, in the one or more auxiliary data structures with a computer processor programmed therefor, field value strings only among the selected queried data fields of the corresponding data record, to identify data records that satisfy the search query of part (A), wherein the field value strings interrogated in part (C) for each data record are determined in part by the corresponding indicator string identified in part (B); (D) for each first-level branch-node field value that does not satisfy the search query of part (A), omitting from the interrogation of part (C) terminal-node field value strings of the corresponding first-level branch-node subset of the data records; and (E) automatically generating, with a computer processor programmed therefor, a list or an enumeration of data records that are identified in part (C) as satisfying the search query received in part (A).

Example 14. A computer system structured, connected, and programmed to perform the method of Example 13.

Example 15. An article comprising one or more tangible, non-transitory computer-readable storage media encoding computer-readable instructions that, when applied to a computer system, instruct the computer to perform the method of Example 13.

Example 16. The article of any one of Examples 1 through 9 wherein: (b') the defined data fields further include one or more levels of higher-level branch-node data fields, and the first-level and higher-level branch-node data fields define a hierarchical tree relationship among subranges of field value strings of the branch-node data fields, which subranges correspond to the multiple first-level branch-node subsets, and one or more levels of higher-level branch-node subsets, of the data records of the dataset; (c') for each level of higher-level branch-node data fields, each higher-level branch-node subset includes data records for which field value strings of the higher-level branch-node data fields of that level fall within the corresponding subrange; (d') for each terminal-node binary string the indicator string indicates (i) the terminal-node binary string and an immediately adjacent terminal-node binary string in the ordered sequence correspond to respective data records that are both in the same first-level branch-node subset, (ii) the respective data records are in first-level branch-node subsets different from each other but are not in different higher-level branch-node subsets, (iii) the respective data records are in first-level branch-node subsets different from each other and a highest level among the branch-node subsets at which the respective data records also are in higher-level branch-node subsets different from each other, or (iv) the terminal-node binary string is the last terminal-node binary string of the inline tree data structure; and (e') for each higher-level branch-node subset, the corresponding terminal-node binary strings form a single contiguous string sequence within the inline tree data structure.

Example 17. The article of Example 16 wherein, for each terminal-node binary string, the indicator string indicates (i) the terminal-node binary string and the immediately succeeding terminal-node binary string in the ordered sequence correspond to respective data records that are both in the same first-level branch-node subset, (ii) the respective data records are in first-level branch-node subsets different from each other but are not in different higher-level branch-node subsets, (iii) the respective data records are in first-level branch-node subsets different from each other and a highest level among the branch-node subsets at which the respective data records also are in higher-level branch-node subsets different from each other, or (iv) the terminal-node binary string is the last terminal-node binary string of the inline tree data structure.

Example 18. The article of Example 16 wherein, for each terminal-node binary string, the indicator string indicates (i) the terminal-node binary string and the immediately preceding terminal-node binary string in the ordered sequence correspond to respective data records that are both in the same first-level branch-node subset, (ii) the respective data records are in first-level branch-node subsets different from each other but are not in different higher-level branch-node subsets, or (iii) the respective data records are in first-level branch-node subsets different from each other and a highest level among the branch-node subsets at which the respective data records also are in higher-level branch-node subsets different from each other.

Example 19. A computer-implemented method for generating the article of any one of Examples 16 through 18, the method comprising: (A) receiving at a computer system or reading from one or more computer-readable storage media first electronic indicia of the dataset; (B) using one or more electronic processors of the computer system that are programmed therefor and operatively coupled to the one or more storage media, generating second electronic indicia of the dataset, the second electronic indicia comprising (1) the inline tree data structure and (2) the one or more auxiliary data structures; and (C) storing the inline tree data structure and the one or more auxiliary data structures on the one or more tangible, non-transitory computer-readable storage media that are operatively coupled to the one or more electronic processors of the computer system.

Example 20. A computer system structured, connected, and programmed to perform the method of Example 19.

Example 21. An article comprising one or more tangible, non-transitory computer-readable storage media encoding computer-readable instructions that, when applied to a computer system, instruct the computer to perform the method of Example 19.

Example 22. A computer-implemented method for interrogating the inline tree data structure and the one or more auxiliary data structures encoded on the article of any one of Examples 16 through 18, wherein the method comprises: (A) receiving at a computer system a search query for data records of the dataset that include, for each one of one or more selected queried data fields among the defined data fields of the dataset, a corresponding field value that falls within a corresponding queried field value subrange; (B) automatically, with a computer processor programmed therefor, interrogating, in order, the ordered sequence of the terminal-node binary strings of the inline tree data structure to identify the corresponding indicator strings; (C) as each terminal node binary string is interrogated in part (B), automatically interrogating, in the one or more auxiliary data structures with a computer processor programmed therefor, field value strings only among the selected queried data fields of the corresponding data record, to identify data records that satisfy the search query of part (A), wherein the field value strings interrogated in part (C) for each data record are determined in part by the corresponding indicator string identified in part (B); (D) for each first-level branch-node field value that does not satisfy the search query of part (A), omitting from the interrogation of part (C) terminal-node field value strings of the corresponding first-level branch-node subset of the data records; (E) for each higher-level branch-node field value that does not satisfy the search query of part (A), omitting from the interrogation of part (C) first-level and terminal-node field value strings of the corresponding higher-level branch-node subset of the data records; and (F) automatically generating, with a computer processor programmed therefor, a list or an enumeration of data records that are identified in part (C) as satisfying the search query received in part (A).

Example 23. A computer system structured, connected, and programmed to perform the method of Example 22.

Example 24. An article comprising one or more tangible, non-transitory computer-readable storage media encoding computer-readable instructions that, when applied to a computer system, instruct the computer to perform the method of Example 22.

Example 25. An article comprising one or more tangible, non-transitory computer-readable storage media encoded to store electronic indicia of the list or enumeration generated by the method of any one of Examples 13 or 22.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, third, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer-implemented method comprising:
   (a) receiving at a computer system or reading from one or more computer-readable storage media first electronic indicia of a dataset, the dataset comprising a multitude of data records, each data record including field value strings for multiple corresponding defined data fields, the defined data fields including terminal-node data fields and first-level branch-node data fields, the first-level branch-node data fields defining a hierarchical tree relationship among subranges of field value strings of the first-level branch-node data fields, which subranges correspond to multiple first-level branch-node subsets of the data records of the dataset, each first-level branch-node subset including data records for which field value strings of first-level branch-node data fields fall within the corresponding subrange;
   (b) using one or more electronic processors of the computer system that are programmed therefor, generating second electronic indicia of the dataset, the second electronic indicia comprising (1) an inline tree data structure and (2) one or more auxiliary data structures,
   (c) storing the inline tree data structure and the one or more auxiliary data structures on one or more tangible, non-transitory computer-readable storage media that are operatively coupled to the one or more electronic processors of the computer system,
   wherein:
   (d) the inline tree data structure comprises an ordered sequence of only terminal-node binary strings, wherein (1) there is a one-to-one correspondence between the terminal-node binary strings and the data records of the dataset, (2) the terminal-node binary strings have the same length as one another, and (3) each terminal-node binary string includes an indicator string that indicates, for each terminal-node binary string, that (i) the terminal-node binary string and an immediately adjacent terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure;
   (e) for each first-level branch-node subset, the corresponding terminal-node binary strings form a single contiguous string sequence within the inline tree data structure; and
   (f) the one or more auxiliary data structures include electronic indicia of field value strings of the data records of the dataset arranged, indexed, or accessible in the same order as the ordered sequence of terminal-node binary strings in the inline tree data structure.

2. The method of claim 1 wherein, for each terminal-node binary string, the indicator string indicates that (i) the terminal-node binary string and the immediately succeeding terminal-node binary string in the ordered sequence correspond to respective data records that are both in the same first-level branch-node subset, (ii) the respective data records are in first-level branch-node subsets different from each other, or (iii) the terminal-node binary string is the last terminal-node binary string of the inline tree data structure.

3. The method of claim 1 wherein, for each terminal-node binary string, the indicator string indicates (i) the terminal-node binary string and the immediately preceding terminal-node binary string in the ordered sequence correspond to respective data records that are both in the same first-level branch-node subset, or (ii) the respective data records are in first-level branch-node subsets different from each other but are not in different higher-level branch-node subsets.

4. The method of claim 1 wherein each terminal-node binary string of the inline tree data structure includes only the corresponding indicator string and excludes any data string encoding a field value of the corresponding data record.

5. The method of claim 1 wherein each terminal-node binary string of the inline tree data structure includes a data string encoding one or more field values of the corresponding data record.

6. The method of claim 5 wherein each data string includes one or more data field values encoded by string interning.

7. The method of claim 1 wherein one or more of the auxiliary data structures includes one or more data field values encoded by string interning.

8. The method of claim 1 wherein one or more of the auxiliary data structures includes one or more clump data field values that encode a set of multiple clumped data field values.

9. The method of claim 1 wherein with inline tree data structure is stored in computer random access memory or in processor cache memory.

10. An article comprising one or more tangible, non-transitory computer-readable storage media storing the second electronic indicia of the dataset generated by the method of claim 1.

11. A computer-implemented method comprising:
(a) receiving at a computer system or reading from one or more computer-readable storage media first electronic indicia of a dataset, the dataset comprising a multitude of data records, each data record including field value strings for multiple corresponding defined data fields, the defined data fields including terminal-node data fields, first-level branch-node data fields, and one or more levels of higher-level branch-node data fields, the first-level and higher-level branch-node data fields defining a hierarchical tree relationship among subranges of field value strings of the branch-node data fields, which subranges correspond to the multiple first-level branch-node subsets, and one or more levels of higher-level branch-node subsets, of the data records of the dataset, each first-level branch-node subset including data records for which field value strings of first-level branch-node data fields fall within the corresponding subrange, each higher-level branch-node subset including, for each level of higher-level branch-node data fields, data records for which field value strings of the higher-level branch-node data fields of that level fall within the corresponding subrange;
(b) using one or more electronic processors of the computer system that are programmed therefor, generating the data structure comprising second electronic indicia of the dataset, the second electronic indicia comprising (1) an inline tree data structure and (2) one or more auxiliary data structures,
(c) storing the inline tree data structure and the one or more auxiliary data structures on one or more tangible, non-transitory computer-readable storage media that are operatively coupled to the one or more electronic processors of the computer system,
wherein:
(d) the inline tree data structure comprises an ordered sequence of only terminal-node binary strings, wherein (1) there is a one-to-one correspondence between the terminal-node binary strings and the data records of the dataset, (2) the terminal-node binary strings have the same length as one another, and (3) each terminal-node binary string includes an indicator string that indicates, for each terminal-node binary string, that (i) the terminal-node binary string and an immediately adjacent terminal-node binary string in the ordered sequence correspond to respective data records that are both in the same first-level branch-node subset, (ii) the respective data records are in first-level branch-node subsets different from each other but are not in different higher-level branch-node subsets, (iii) the respective data records are in first-level branch-node subsets different from each other and a highest level among the branch-node subsets at which the respective data records also are in higher-level branch-node subsets different from each other, or (iv) the terminal-node binary string is the last terminal-node binary string of the inline tree data structure;
(e) for each first-level branch-node subset, the corresponding terminal-node binary strings form a single contiguous string sequence within the inline tree data structure, and for each higher-level branch-node subset, the corresponding terminal-node binary strings form a single contiguous string sequence within the inline tree data structure; and
(f) the one or more auxiliary data structures include electronic indicia of field value strings of the data records of the dataset arranged, indexed, or accessible in the same order as the ordered sequence of terminal-node binary strings in the inline tree data structure.

12. The method of claim 11 wherein, for each terminal-node binary string, the indicator string indicates (i) the terminal-node binary string and the immediately succeeding terminal-node binary string in the ordered sequence correspond to respective data records that are both in the same first-level branch-node subset, (ii) the respective data records are in first-level branch-node subsets different from each other but are not in different higher-level branch-node subsets, (iii) the respective data records are in first-level branch-node subsets different from each other and a highest level among the branch-node subsets at which the respective data records also are in higher-level branch-node subsets different from each other, or (iv) the terminal-node binary string is the last terminal-node binary string of the inline tree data structure.

13. The method of claim 11 wherein, for each terminal-node binary string, the indicator string indicates (i) the terminal-node binary string and the immediately preceding terminal-node binary string in the ordered sequence correspond to respective data records that are both in the same first-level branch-node subset, (ii) the respective data records are in first-level branch-node subsets different from each other but are not in different higher-level branch-node subsets, or (iii) the respective data records are in first-level branch-node subsets different from each other and a highest level among the branch-node subsets at which the respective data records also are in higher-level branch-node subsets different from each other.

14. The method of claim 11 wherein each terminal-node binary string of the inline tree data structure includes only the corresponding indicator string and excludes any data string encoding a field value of the corresponding data record.

15. The method of claim 11 wherein each terminal-node binary string of the inline tree data structure includes a data string encoding one or more field values of the corresponding data record.

16. The method of claim 11 wherein each data string includes one or more data field values encoded by string interning.

17. The method of claim 11 wherein one or more of the auxiliary data structures includes one or more data field values encoded by string interning.

18. The method of claim 11 wherein one or more of the auxiliary data structures includes one or more clump data field values that encode a set of multiple clumped data field values.

19. The method of claim 11 wherein with inline tree data structure is stored in computer random access memory or in processor cache memory.

20. An article comprising one or more tangible, non-transitory computer-readable storage media storing the second electronic indicia of the dataset generated by the method of claim 11.

* * * * *